(12) United States Patent
Lucka et al.

(10) Patent No.: US 11,668,268 B2
(45) Date of Patent: Jun. 6, 2023

(54) MAGNETICALLY LATCHING VALVE FOR FUEL VAPOR MANAGEMENT SYSTEMS AND SYSTEMS INCORPORATING SAME

(71) Applicant: DAYCO IP HOLDINGS, LLC, Roseville, MI (US)

(72) Inventors: Kevin W. Lucka, Southfield, MI (US); Matthew C. Gilmer, South Lyon, MI (US); Donald P. Tinsley, III, Huntington Woods, MI (US); David Snow, Redford, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/566,785

(22) Filed: Dec. 31, 2021

(65) Prior Publication Data
US 2022/0213850 A1    Jul. 7, 2022

Related U.S. Application Data

(60) Provisional application No. 63/161,494, filed on Mar. 16, 2021, provisional application No. 63/133,313, filed on Jan. 2, 2021.

(51) Int. Cl.
*F02M 25/08* (2006.01)
*F02M 35/10* (2006.01)
(Continued)

(52) U.S. Cl.
CPC .. *F02M 25/0836* (2013.01); *F02M 35/10222* (2013.01); *F16K 31/0655* (2013.01); *F16K 31/082* (2013.01); *F02M 2025/0845* (2013.01)

(58) Field of Classification Search
CPC ............ F02M 25/08; F02M 25/0836; F02M 2025/0845; F16K 31/06; F16K 31/0655;
(Continued)

(56) References Cited

U.S. PATENT DOCUMENTS 4,383,234 A * 5/1983 Yatsushiro ............ H01F 7/1615
335/255
6,076,550 A * 6/2000 Hiraishi ................ H01F 7/1607
251/38

(Continued)

*Primary Examiner* — John Kwon
*Assistant Examiner* — Johnny H Hoang
(74) *Attorney, Agent, or Firm* — FisherBroyles, LLP; Susan M. Oiler

(57) ABSTRACT

Magnetic latching valves for a vehicle engine have a housing having a first port and a second port in controlled fluid communication with one another. The housing encloses a linearly translatable armature seated within a solenoid and connected to a primary poppet valve. The armature is movable between an open position and a closed position, respectively, after a pulse of voltage to the solenoid and is in an unpowered state thereafter. A permanent magnet is fixedly seated in a position to magnetically latch the armature in a fully open position. A spring is seated to bias the primary poppet valve closed when the armature is in the closed position. The spring has a spring rate that mechanically relieves pressure by opening the primary poppet valve a distance less than the fully open position when the spring force is exceeded, thereby also allowing flow in the primary flow direction.

13 Claims, 17 Drawing Sheets

(51) Int. Cl.
*F16K 31/06* (2006.01)
*F16K 31/08* (2006.01)

(58) Field of Classification Search
CPC .... F16K 31/0675; F16K 31/08; F16K 31/082; F16K 15/03; F16K 15/035; F16K 15/03519
See application file for complete search history.

(56) References Cited

U.S. PATENT DOCUMENTS

| | | | |
|---|---|---|---|
| 7,011,078 B2* | 3/2006 | Yamaguchi | F02B 25/14 123/527 |
| 8,789,557 B2* | 7/2014 | Muller-Riederer | F16K 31/0655 137/493.9 |
| 2016/0375759 A1* | 12/2016 | Vulkan | F16K 17/04 137/15.08 |
| 2018/0245708 A1* | 8/2018 | Chiapasco | F16K 31/082 |
| 2019/0120402 A1* | 4/2019 | Jamison | F16K 31/0627 |
| 2022/0082057 A1* | 3/2022 | Petri | F02M 25/0836 |

* cited by examiner

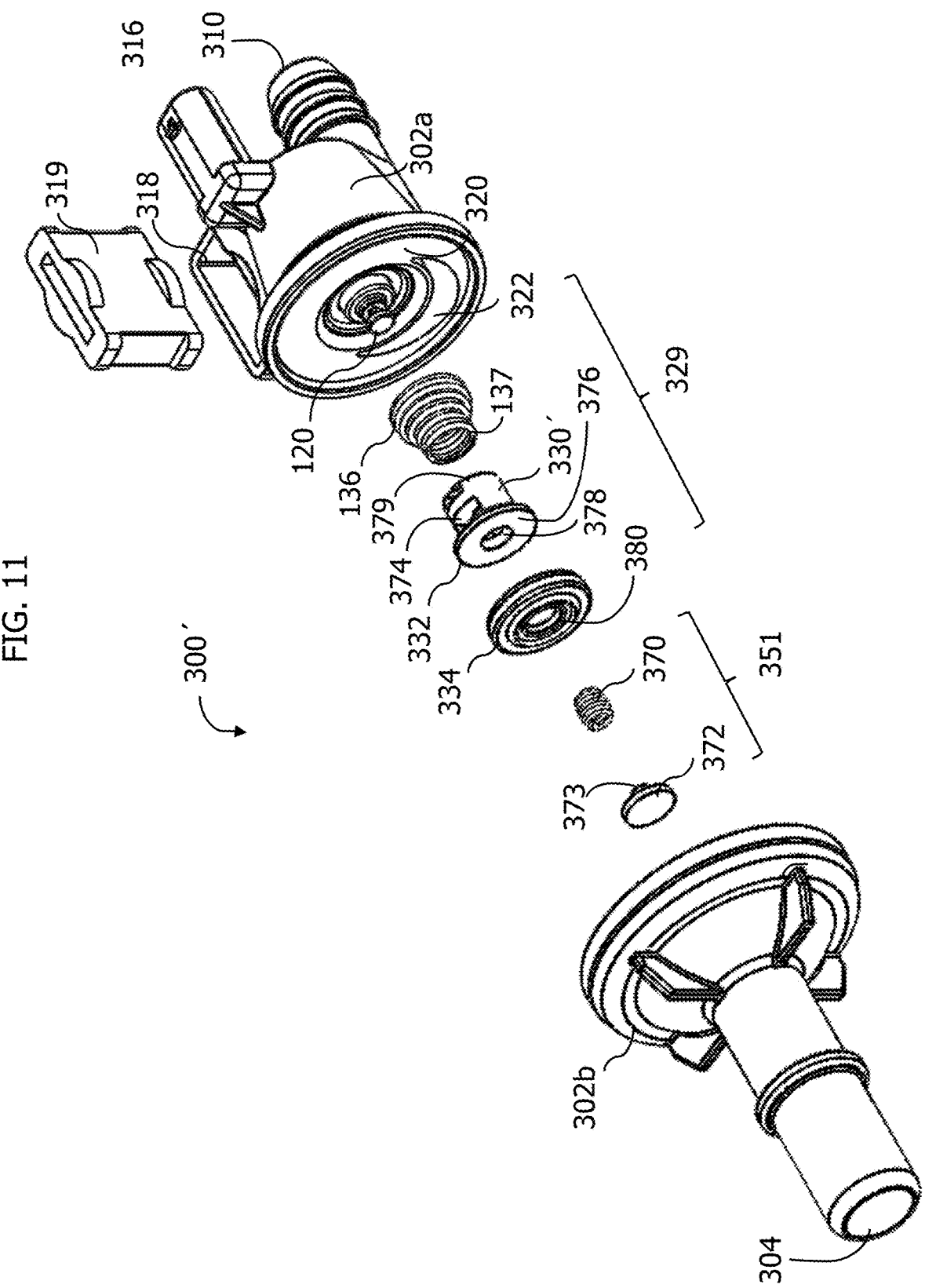

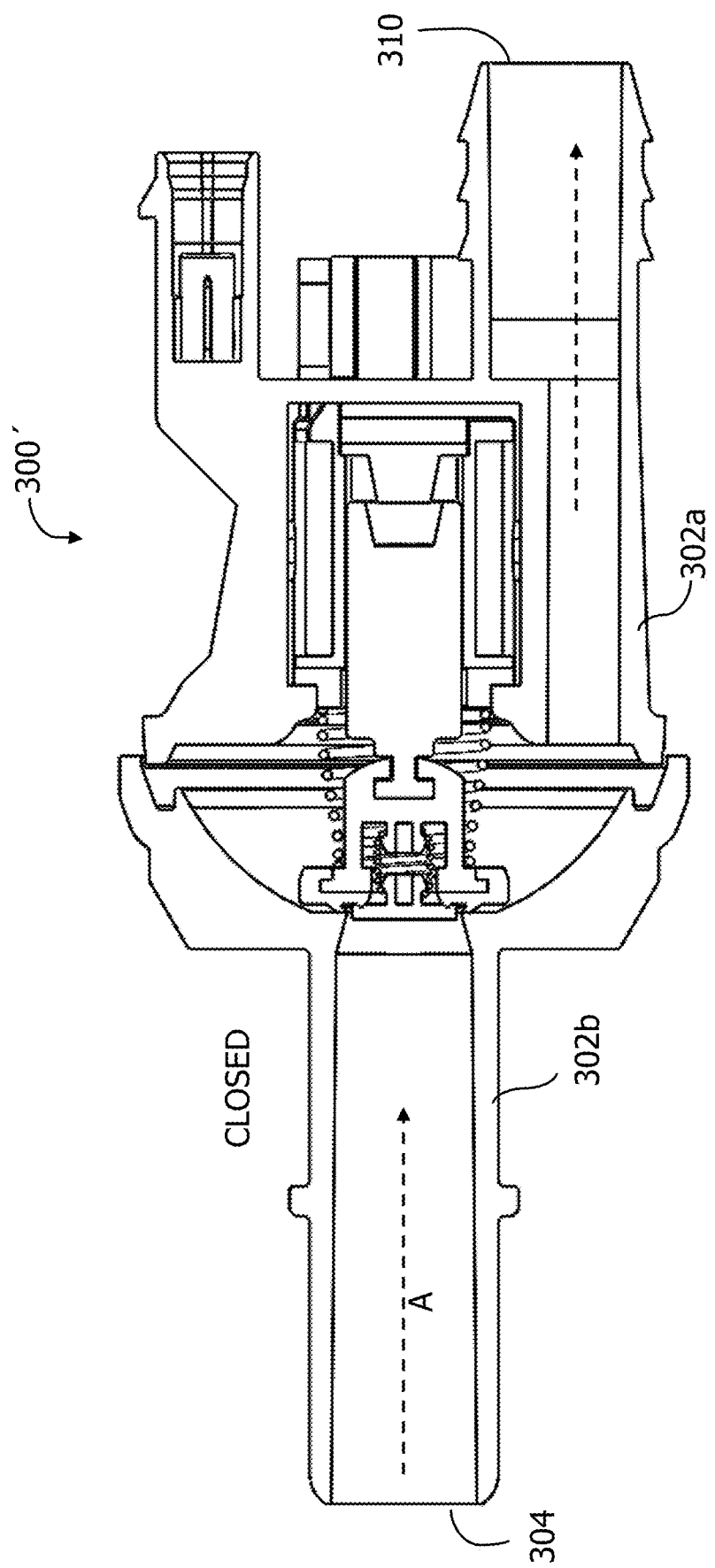

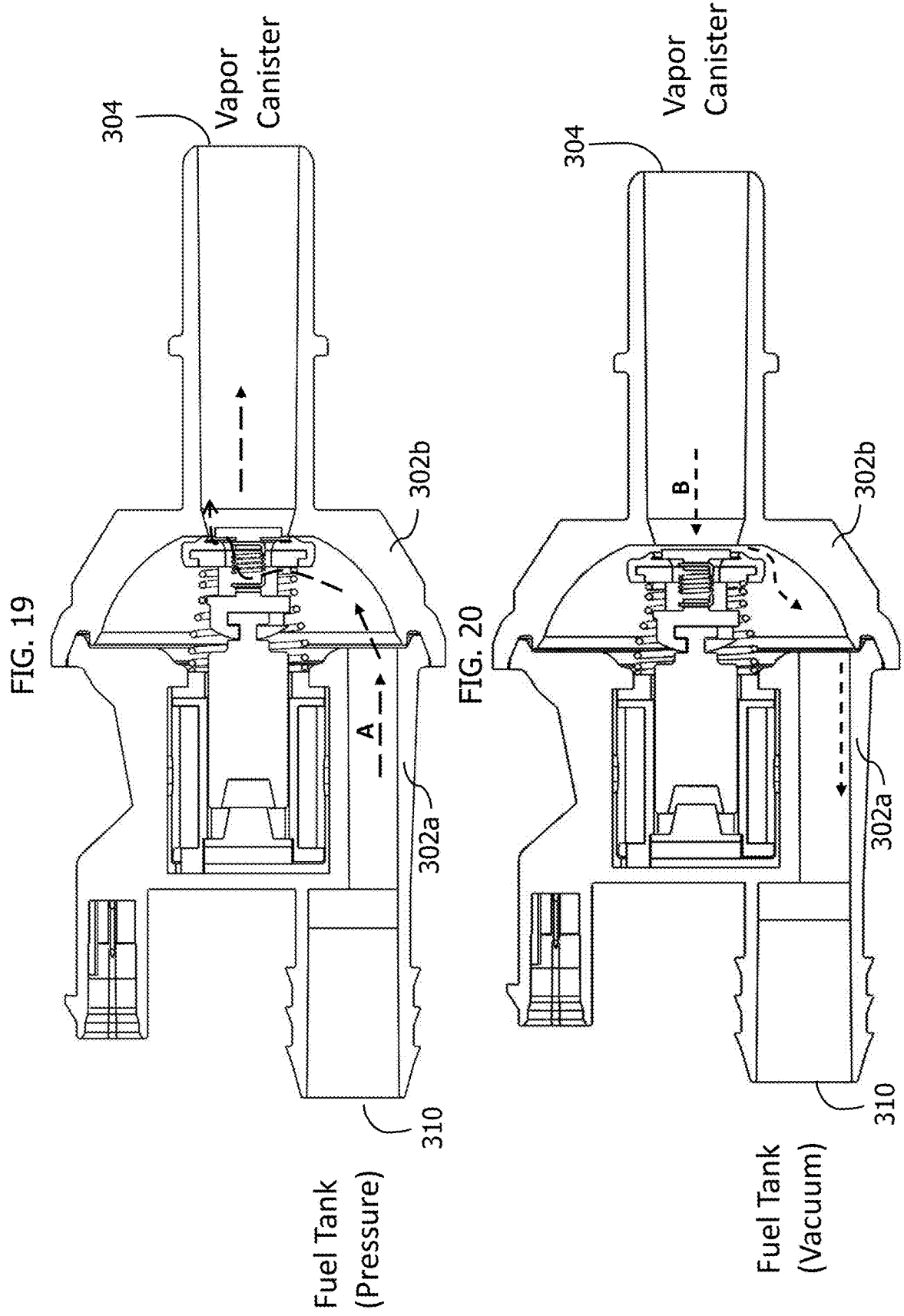

MAGNETICALLY LATCHING VALVE FOR FUEL VAPOR MANAGEMENT SYSTEMS AND SYSTEMS INCORPORATING SAME

RELATED APPLICATIONS

This application claims the benefit of U.S. Provisional Application No. 63/133,313, filed Jan. 2, 2021 and U.S. Provisional Application No. 63/161,494, filed Mar. 16, 2021, which are both incorporated herein by reference in their entirety.

TECHNICAL FIELD

This application relates to a magnetically latching valve for fuel vapor management engine systems, more particularly, to a magnetically latching valve that magnetically latches in an open position during a vehicle refueling event, is normally closed during normal operation, and has an over-pressure relief function to protect the fuel tank structural integrity.

BACKGROUND

A valve that is primarily open when a customer needs to refuel a vehicle with a pressurized fuel system is commonly used in and is required for hybrid vehicles. The valve is located in the fuel vapor system between the fuel tank vapor dome and the fuel vapor carbon canister. The valve also provides a strictly mechanical function of opening and allowing flow under certain conditions to provide pressure relief under normal operating conditions to protect the fuel tank structural integrity.

A refueling valve allows vehicles to meet emissions regulations, such as set by the EPA, CARB, China 6, Euro 6.2 for Hybrid Electric Vehicles (HEVs) and Plug-In Hybrid Electric Vehicles (PHEVs), to keep the vapors stored within the fuel tank. The fuel vapor in a conventional non-hybrid system is allowed to have an open flow path to a fuel vapor canister because the engine will run enough to purge the fuel vapor canister. When the engine is in boost or vacuum, there is an opportunity to draw the fuel vapor off of the carbon particles in the fuel vapor canister and draw the fuel vapor into the intake manifold to be used as fuel. However, in a HEV or PHEV system, where the engine run time is very low, the fuel vapor canister would become saturated with fuel vapor and start emitting the fuel vapor into the atmosphere if there was an open path between the fuel tank and the canister. As such, a non-integrated refueling canister only system (NIRCOS) on HEVs and PHEVs is present, which has a valve that blocks fuel vapors from the fuel tank from flowing to the carbon canister, except during a refueling event.

There is a need to eliminate the hardware that indexes the valve position in commercially available mechanical latching valves in NIRCOS system of hybrid vehicles and, optionally, to provide a valve that can depressurize the fuel tank vapors to maintain the structural integrity of the fuel tank and over-pressure relief in a compact single unit.

BRIEF DESCRIPTION OF THE DRAWINGS

FIG. 11 is an exploded view of a third embodiment of a magnetically latching valve.

FIG. 14 is a longitudinal cross-section of the third embodiment in a fully closed position when the first port 304 is in fluid communication with headspace of a fuel tank and the second port 310 is in fluid communication with the fuel vapor canister.

FIG. 19 is a longitudinal cross-section of the third embodiment relative to FIG. 18 with the secondary poppet valve in a pressure relief open position.

FIG. 20 is a longitudinal cross-section of the third embodiment relative to FIG. 18 with the primary poppet valve in an un-commanded vacuum relief partially open position.

SUMMARY

Figure 1:
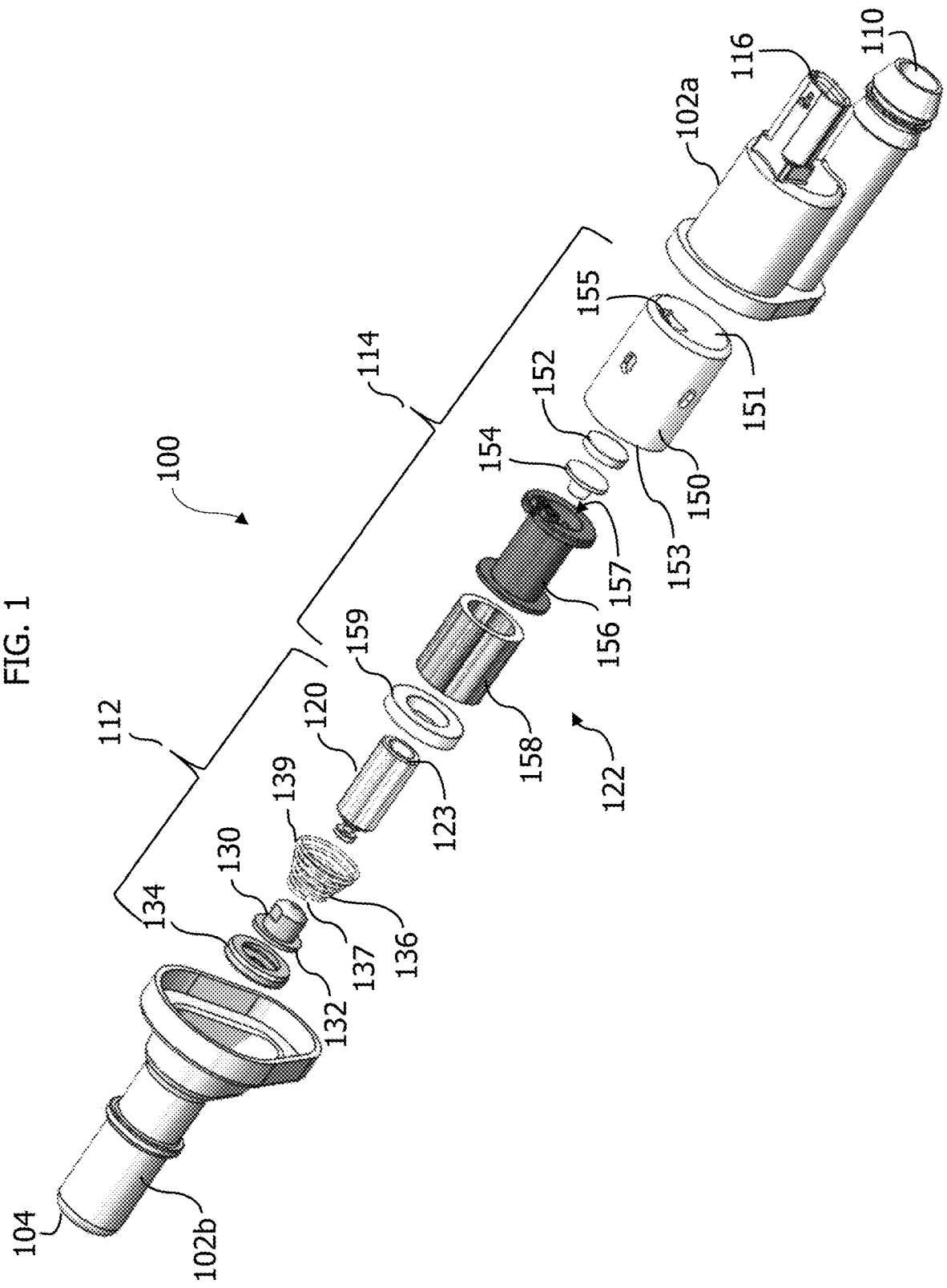
FIG. 1 is an exploded view of a magnetically latching valve.

In all aspects magnetic latching valves for vehicle engines are disclosed that have a housing having a first port and a second port in controlled fluid communication with one another. The housing encloses a linearly translatable armature seated within a solenoid and connected to a primary poppet valve. The armature is movable between a fully open position and a closed position, respectively, after a pulse of voltage to the solenoid and is in an unpowered state thereafter. A permanent magnet is fixedly seated within the housing in a position to magnetically latch the armature in the fully open position after one pulse of voltage to the solenoid moves the armature to the fully open position for primary flow from the first port to the second port. A spring is seated against the primary poppet valve and biases the primary poppet valve closed when the armature is in the closed position. The spring has a pre-selected spring rate that mechanically relieves pressure by opening the primary poppet valve a distance less than the fully open position when the spring force is exceeded, thereby also allowing flow in the primary flow direction. The housing defines a plug or plug receptacle in electrical communication with the solenoid.

In all aspects, the spring can be a coil spring, such as a conically shaped coil spring.

In one embodiment, the magnetic latching valve includes a secondary poppet valve operatively closed by a secondary spring. The secondary poppet valve is oriented and has a spring rate preselected to be overcome to open only the secondary poppet valve when a pressure differential is present relative to the first port and the second port that overcomes the force applied by the secondary spring. The secondary poppet valve is coaxially centered in the poppet of the primary poppet valve and is biased against the poppet by a tension spring housed inside the poppet plug of the primary poppet valve and the fluid flow path is through the poppet of the primary poppet valve. The tension spring in positioned more proximate the first port than the spring of the primary poppet valve. In a second embodiment, the secondary poppet valve is offset from the primary poppet valve and is seated in a bore that is in fluid communication with both the first port and the second port.

In another aspect, systems for refueling a vehicle having an internal combustion engine are disclosed. The system has a fuel tank in fluid communication with a filling tube, one of the magnetically latching valves disclosed herein that includes the secondary poppet valve controlling fluid communication between vapors in the fuel tank and a fuel vapor canister, and an intake manifold of an internal combustion engine in fluid communication with the fuel vapor canister. The magnetically latching valve is in electrical communication with a controller, and the controller opens the magnetically latching valve during vehicle refueling and closes the magnetically latching valve during normal operation. The valve is orientable between the fuel tank and the fuel vapor with either of the first port or the second port in fluid communication with the vapors in the fuel tank, thereby changing which of the primary spring or the secondary spring provides fuel tank vacuum relief. The solenoid is in electrical communication with a plug or plug receptacle in the housing and the plug or plug receptacle is connected to a mating electrical connector in electrical communication with the controller. The controller can include an H-bridge control system that reverse the polarity of the solenoid to move the armature between the open position and the closed position. In one embodiment, the internal combustion engine is a hybrid engine.

In one aspect, the system is a boosted system having a Venturi device in a bypass around a turbocharger or supercharger and the Venturi device has a suction port in fluid communication with the fuel vapor canister. The system can include a canister purge valve controlling fluid communication between the fuel vapor canister and the intake manifold, and the suction port is in fluid communication with the fuel vapor canister, upstream of the canister purge valve.

In another aspect, the magnetically latching valve is in parallel flow relationship with a tank pressure control valve.

In another aspect, the pre-selected spring rate is set to prevent fuel nozzle shut offs during refueling.

In one embodiment, the secondary poppet valve is coaxially centered in the poppet of the primary poppet valve and is biased against the poppet by a tension spring housed inside the poppet of the primary poppet valve and the fluid flow path is through the poppet of the primary poppet valve. In another embodiment, the secondary poppet valve is offset from the primary poppet valve and is seated in a bore that is in fluid communication with both the first port and the second port.

DETAILED DESCRIPTION

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof. In fuel vapor management systems, the fluid is typically a gas when moving through the magnetic latching valve.

Figure 2:
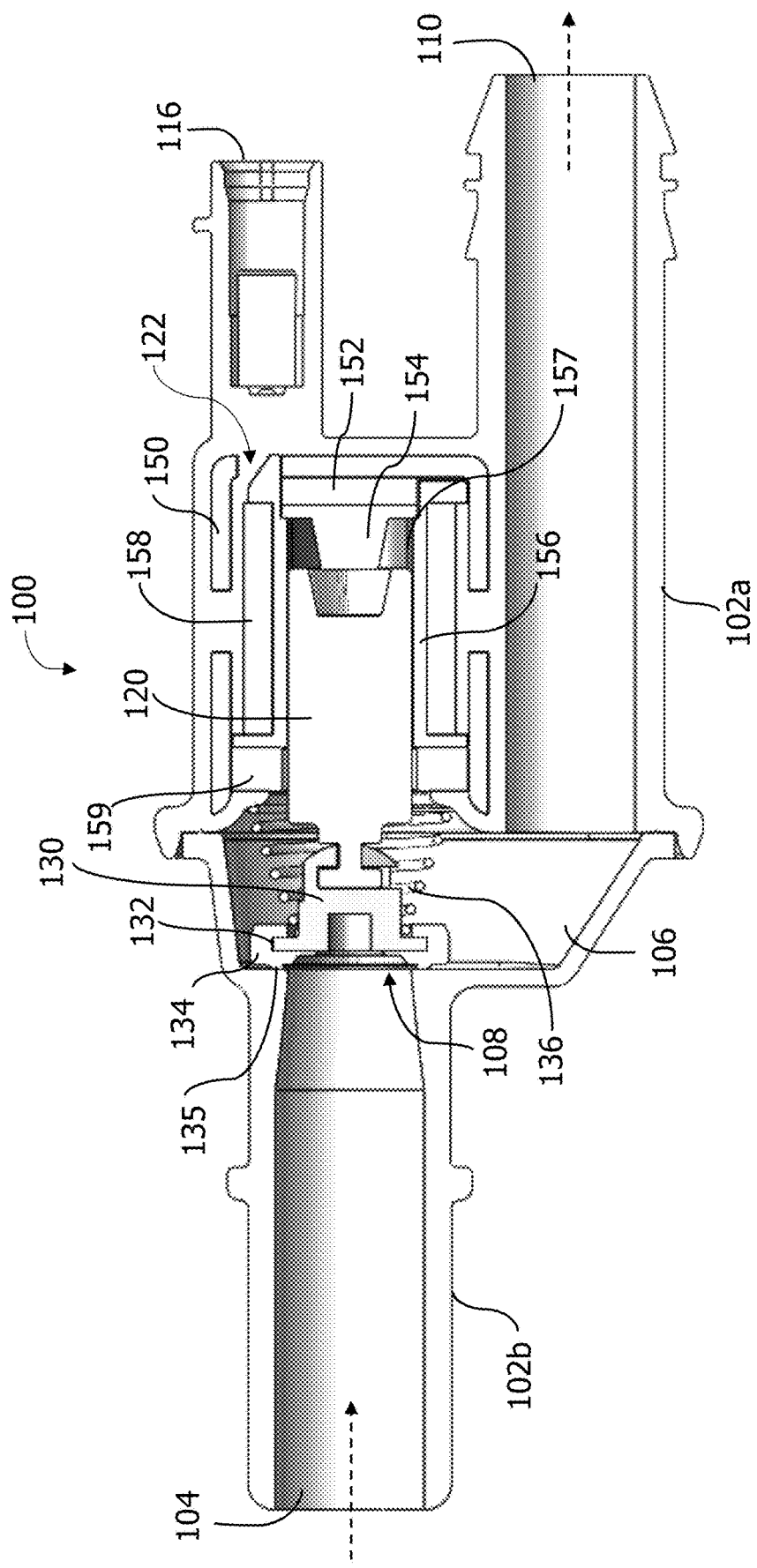
FIG. 2 is a longitudinal cross-section of the magnetically latching valve of FIG. 1.

Referring to FIGS. 1 and 2, a magnetic latching valve 100 for a fuel vapor management system is shown. The magnetic latching valve 100 has a housing 102 defined in two parts, a base 102a and a cover 102b, that are mated with a fluid tight seal as shown in FIG. 2. The fluid tight seal may be formed by heat welding, laser welding, a snap-fit, an interference fit, an adhesive bond, or other known or herein after developed methods. The cover 102b includes a first port 104 in fluid communication with the chamber 106. The base 102a includes a second port 110 in fluid communication with a chamber 106 defined by the housing 102. The junction of the first port 104 with the chamber 106 defines a valve opening 108. The fluid communication between the first port 104 and the second port 110 is controlled by a linearly translatable armature 120 seated within a solenoid 122 and connected to a poppet valve 129 that makes a fluid tight seal with the valve opening 108 when the magnetic latching valve 100 is in a closed position as shown in FIG. 2. The base 102a includes an electrical plug or plug receptacle 116 that is in electrical communication with the wire coil 158 of the solenoid 122. The electrical plug or plug receptacle 116 is connectable to a mating electrical connector (not shown) in electrical communication with a controller of the fuel vapor management system or an internal combustion engine. Each of the exterior surfaces of the first port 104 and the second port 110 may include connecting features, such as flanges, ribs, grooves, barbs, or the like to attach a hose thereto or a duct of a device within the engine system.

The valve mechanism enclosed within housing 102 can be characterized as having moving components 112 and stationary components 114. The moving components 112 includes the armature 120, the poppet plug 130, an annual seal ring 134 seated over a radially protruding flange 132 of the poppet plug 130, and a spring 136 biasing the poppet valve toward the valve opening 108. The stationary components 114 include a solenoid housing 150, having a closed end 151 and an open end 153, in which is seated, in order, a permanent magnet 152, a stop 154 that receives a first end 123 of the armature 120, a bobbin 156 having a solenoid 122 seated thereon, and a cover 159 fixedly connected to the open end of the housing. The armature 120 is linearly translatable within the solenoid 122, more specifically within the hollow core 157 of the bobbin 156, and it can move between an open position and a closed position, respectively, after a pulse of voltage is supplied to the solenoid. The permanent magnet 152 is fixedly seated within the housing 102, and respectively the solenoid housing 150, at a position for magnetically latching the armature 120 in the open position after one pulse of voltage to the solenoid 122 moves the armature 120 to the open position. The spring 136 is seated around the connection of the armature 120 to the poppet plug 130 and has a first end 137 against the poppet plug 130 and a second end 139 against either the base 102b or the solenoid housing 150. The spring 136 biases the poppet plug 130 toward the valve opening 108 when the armature is in the closed position (FIG. 2) and has a pre-selected spring rate that mechanically relieves pressure if the spring force is exceeded while the armature 120 is in the closed position.

The housing 102 is typically plastic, such as, but not limited to, nylon 6, nylon 4/6, nylon 6/6 and/or polyoxymethylene. Plastic embodiments enable the housing to be produced using molding techniques, including but not limited to injection molding. Furthermore, such housing material are fuel resistant, i.e., resist warpage from exposure to gasoline (liquid or gas).

As best seen in FIG. 1, the solenoid housing 150 includes keys or keyways mateable to the opposite feature inside the base 102b. Also shown in FIG. 1, the solenoid housing 150 has a plurality of boreholes radially through the side thereof for registration with the base 102b. In one embodiment, the base 102b is over molded to the solenoid housing 150. The solenoid housing 150 includes an opening 155 in the closed end 151 thereof for electrical wiring to pass therethrough to connect the solenoid to the electrical plug or plug receptacle 116.

In the embodiment of FIGS. 1 and 2, the spring 136 is a coil spring. In one embodiment, the coil spring is conically shaped and has the smaller end seated against the poppet plug 130. In all embodiments, the spring is tuned to have a pre-selected spring rate set to open the poppet valve 129 at a threshold pressure of the vapors in the fuel tank below a structural integrity pressure of the fuel tank. The structural integrity pressure of the fuel tank is a value above which the fuel tank could experience a rupture. While a coil spring is illustrated, the spring 136 is not limited thereto.

The annual seal ring 134 of the poppet plug 130 can be overmolded to the flange 132 thereof or elastically stretched to fit thereover. Referring to FIG. 2, the annual seal ring 134 can have an axially facing protruding annular ring 135 facing the valve opening 108 to enhance the fluid tight seal therebetween. The annular seal ring 134 may be constructed of a fluoroelastomer. Suitable fluoroelastomers include, but are not limited to, polyvinyl fluoride, polyvinylidene fluorides, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, or other commercially available elastomeric material that will provide seal integrity under a fuel management system's operating conditions.

In operation, the magnetically latching valve 100 is normally closed, with the spring 136 biasing the poppet valve into a fluid tight seal against the valve opening 108. When commanded open, such as during a refueling of a vehicle, a first pulse of voltage is applied to the solenoid 122 to linearly translate the armature 120 to the open position. Then, in an unpowered state, the permanent magnet 152 holds the armature by magnetic attraction thereto with the spring 136 in a compressed state. As is understood, the armature 120 is made of a ferromagnetic material in order to be magnetically attracted to the permanent magnet 152. Subsequently, when the valve needs to be closed, a second pulse of voltage is applied to the solenoid 122 that reverses the polarity of the solenoid 122, so that the armature 120 is moved away from the permanent magnet 152. In the closed position, the valve is again in an unpowered state with the spring 136 biasing the poppet plug 130 into a fluid tight seal against the valve opening 108. As such, the magnetically latching valve requires very little power.

The magnetically latching valve 100 can be operated with an H-Bridge control system that reverses polarity to allow the armature to move between the two positions, i.e., the open position and the closed position. In one embodiment, the H-Bridge control system is part of the controller 280 shown in FIG. 3. In another embodiment, the control system can be stored in a microprocessor housed within the magnetically latching valve 100.

Figure 3:
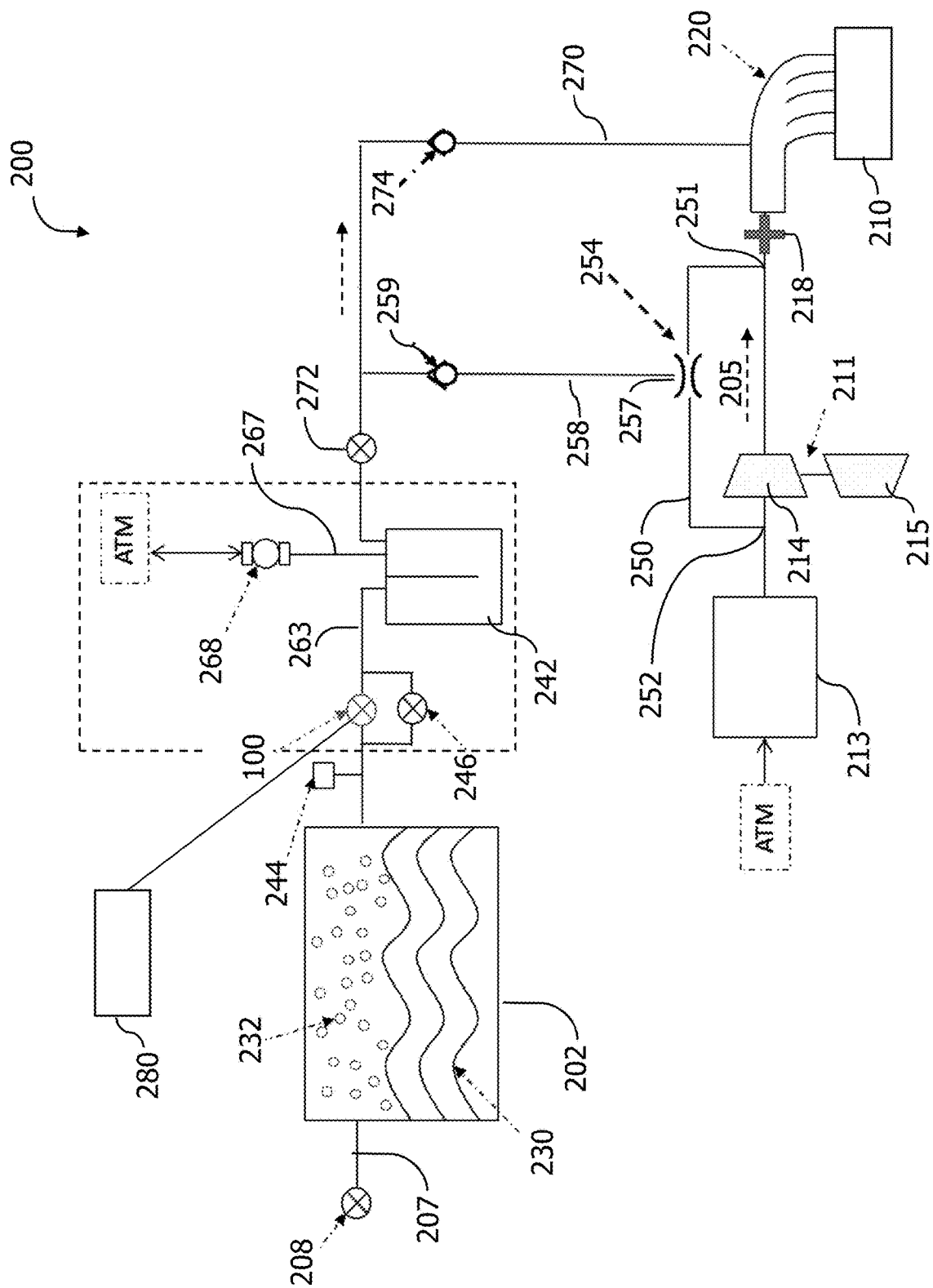
FIG. 3 is a schematic illustration of a turbocharged hybrid engine system having a magnetically latching valve of FIG. 1 as a refueling valve between the fuel tank and the canister.

Referring now to FIG. 3, a hybrid electric vehicle engine system 200 is shown, which is a turbocharged or supercharged system having a turbocharger, a supercharger or the like, referred to herein collectively as turbocharger 211. The hybrid vehicle engine can be a plug-in engine system. The engine system 200 is configured for combusting fuel vapor from a fuel tank 202 which accumulates in at least one component thereof and includes a multi-cylinder internal combustion engine 210 using a non-integrated refueling canister only system (NIRCOS). The engine system 200 receives atmospheric air (ATM) from an air intake, which may include an air filter 213 (also known as an air cleaner). The turbocharger 211 has a turbine 215 operating a compressor 214, which receives air from the air intake air filter 213, compresses the air, and directs a flow of compressed air 205 (sometimes called "boosted" air) downstream, optionally, through a charge air cooler or intercooler (not shown) and then to a throttle 218. The throttle 218 controls fluid communication between the compressor 214 and the intake manifold 220 of the engine 210. The throttle 218 is operable using known techniques to vary an amount of intake air provided to the intake manifold 220 and the cylinders of the engine.

A bypass conduit 250 is included around the turbocharger 211. The bypass conduit 250 has an entrance 251 downstream of the compressor 214 and upstream of the throttle 218 and has an exit 252 upstream of the compressor 214. The entrance 251 may be upstream or downstream of an intercooler (not shown). The bypass conduit 250 includes a Venturi device 254 for generating vacuum. The Venturi device 254 has a motive entrance in fluid communication with the entrance 251, a discharge exit in fluid communication with the exit 252, and a suction portion 257 in fluid communication with the fuel tank 202 and the fuel vapor canister 242 via a suction conduit 258, upstream of a canister purge valve 272. The Venturi device 254 may have the particulars of any of the devices in any of Applicant's applications or granted patents, e.g., U.S. Pat. Nos. 9,827, 963 and 9,534,704, and may include an integral check vale 259 preventing flow from the Venturi device 254 through the suction port 257 toward the fuel tank 202. Otherwise, the check valve 259 may be a separate check valve in the suction conduit 258.

Still referring to FIG. 3, the fuel tank 202 is a reservoir for holding fuel 230 and fuel vapors 232 to be supplied to the internal combustion engine 210 via a fuel deliver system such as a fuel pump (not shown) and includes a filler neck 207 and a filler valve 208 that receives a refill nozzle. The fuel tank 202 is operatively connected to a fuel vapor canister 242 for fluid communication of fuel vapors 232 therewith through a first conduit 263. Fuel vapor canister 242 contains carbon, and such canisters are well known. The first conduit 263 includes the magnetically latching valve 100 described above. The magnetically latching valve 100 has the first port 104 in fluid communication with the fuel tank 202 and the second port 110 in fluid communication with the fuel vapor canister 242. The magnetically latching valve 100 controls fluid communication between the fuel tank's fuel vapors 232 and the fuel vapor canister 242. A pressure sensor 244 may be present between the fuel tank and the magnetically latching valve 100 to detect the high pressure of the fuel tank vapors 232. Additionally, a fuel tank pressure control valve 246 can be present in a parallel flow relationship, i.e., in a bypass loop around the magnetically latching valve 100. One embodiment of a fuel tank pressure control valve 246 is disclosed in U.S. application Ser. No. 16/875,601.

The fuel vapor canister 242 has a second conduit 267 in fluid communication with the atmosphere. A canister vent valve or an evaporative leak check monitor 268 is present in the second conduit 267 and controls the fluid communication between the fuel vapor canister 242 and atmosphere. A canister purge valve 272 is present in the conduit 270 between the fuel vapor canister 242 and the intake manifold 220 to control fluid communication therebetween. An additional check valve 274 may also be present between the canister purge valve 270 and the intake manifold 220 to prevent fluid from flowing from the intake manifold 220 to the fuel vapor canister 242.

A controller 280 can regulate the operation of the engine 210 and its fuel delivery as well as other vehicle systems. The controller 280 is electrically connected to the magnetically latching valve 100 via the electrical plug or electrical receptacle 116 of the valve 100 as a direct or indirect connection.

Figure 4:
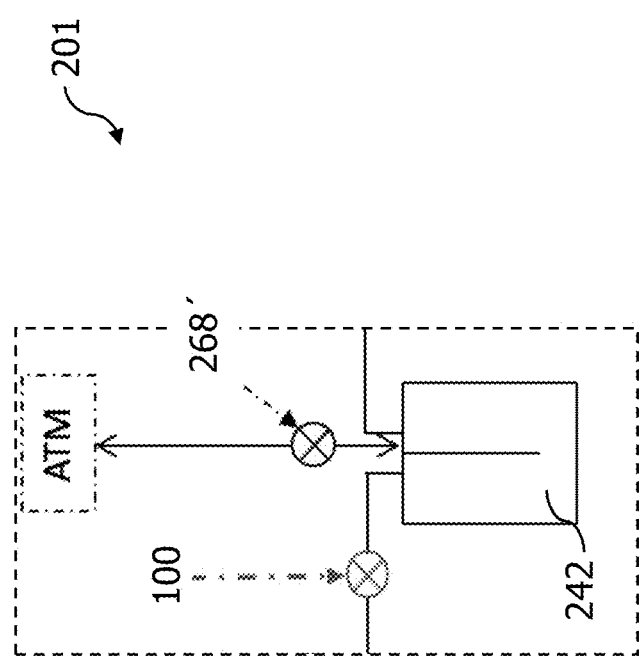
FIG. 4 is a schematic illustration of a first alternative configuration for the fuel vapor portion of FIG. 3 for a conventional gasoline engine having the magnetically latching valve of FIG. 1 as a vapor blocking valve between the refuel tank and the canister.

Turning now to FIG. 4, the magnetically latching valve 100 is compatible with normal gasoline systems as well as high ethanol fuel systems 201, i.e., non-hybrid engine systems, to provide high vapor flow across the valve seat during a refueling event. In such engine systems, the portion inside the dashed box in FIG. 3 is replaced with the configuration shown in FIG. 4. Here, the magnetically latching valve 100 is in fluid communication between the fuel tank 202 and the fuel vapor canister 242 without a tank pressure control valve being present. The pressure sensor 244 is still present between the fuel tank and the magnetically latching valve 100. In the normal gasoline or ethanol fuel systems, it is a canister vent valve 268' that controls the fluid communication between the fuel vapor canister 242 and atmosphere.

One advantage of the magnetic latching valve 100 is its compactness and light weight. The solenoid within the magnetic latching valve 100 has a 3 mm armature stroke, in contrast to commercially available mechanical latching valves which require a larger amount of power to overcome a 7 mm armature stroke. Secondly, the magnetic latching valve 100 holds itself, unpowered, in both the open position and the closed position after a single pulse of voltage to the solenoid. The permanent magnet holds the armature and poppet in the open position. The spring biases poppet, and hence the armature, in the closed position. Third, the valve 100 maintains the fuel tank's integrity and allows enough flow into the carbon canister to prevent fuel nozzle shut offs or premature shut-offs (PSOs) during refueling. This is possible because of the presence of the spring, which seals the valve closed with a voltage pulse to keep the valve in a fully sealed closed position up to a specified pressure, where it will mechanically relieve the pressure at a given set point based on the spring rate.

The valve includes a main sealing surface and a lip, to include a flexible secondary sealing surface in the event of a failure of the primary surface.

In comparison to mechanical latching (indexing) valves, the magnetic latching valve 100 has fewer moving parts and has considerably lower noise, vibration, and harshness (NVH) due to removing the mechanical latching indexing components. Also, there are less potential failure modes because of the reduction in the number of moving components and total components.

Figure 5:
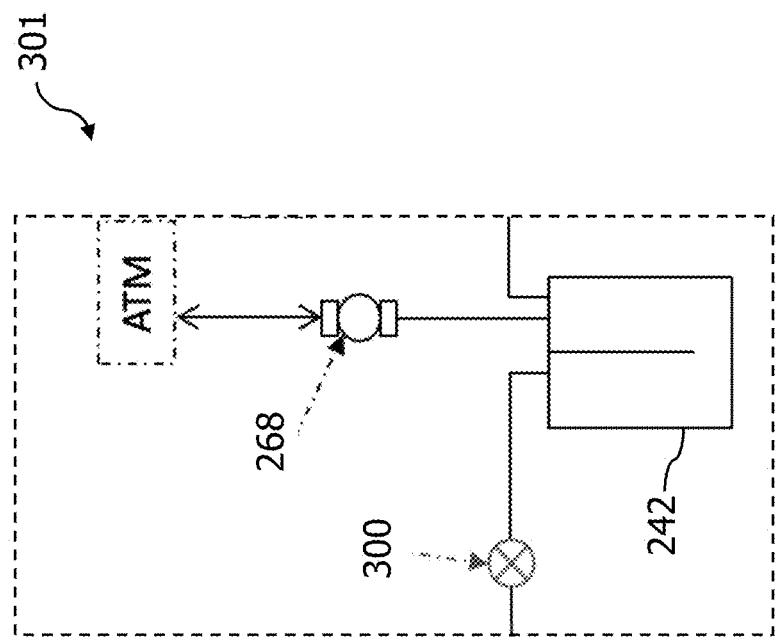
FIG. 5 is a schematic illustration of a second alternative configuration for the fuel vapor portion of FIG. 3 for a hybrid engine system having a fuel tank isolation valve with over-pressure relief and vacuum relief incorporated therein.

Referring now to FIG. 5, a fuel tank isolation valve (FTIV) 300 is present in a hybrid electric vehicle engine system 301 having the canister 242 and valve configuration (evaporative leak check monitor 268 or a canister vent valve 268') leading to atmosphere of FIG. 5 substituted into the dashed box in FIG. 3. Here, the FTIV 300 is located in the fuel vapor system between the fuel tank vapor dome 232 and the fuel vapor carbon canister 242. The FTIV 300 is configured to be commanded fully open using a latching solenoid when a user needs to refuel a vehicle with a pressurized fuel system commonly used and required in hybrid vehicles, but also provides a strictly mechanical function of opening and allowing flow that provides pressure relief (positive pressures in the fuel tank 202) and has a secondary poppet valve that provides a secondary flow path for vacuum relief (negative pressure in the fuel tank 202) under pre-selected engine operating conditions to protect the fuel tank's structural integrity.

Figure 6:
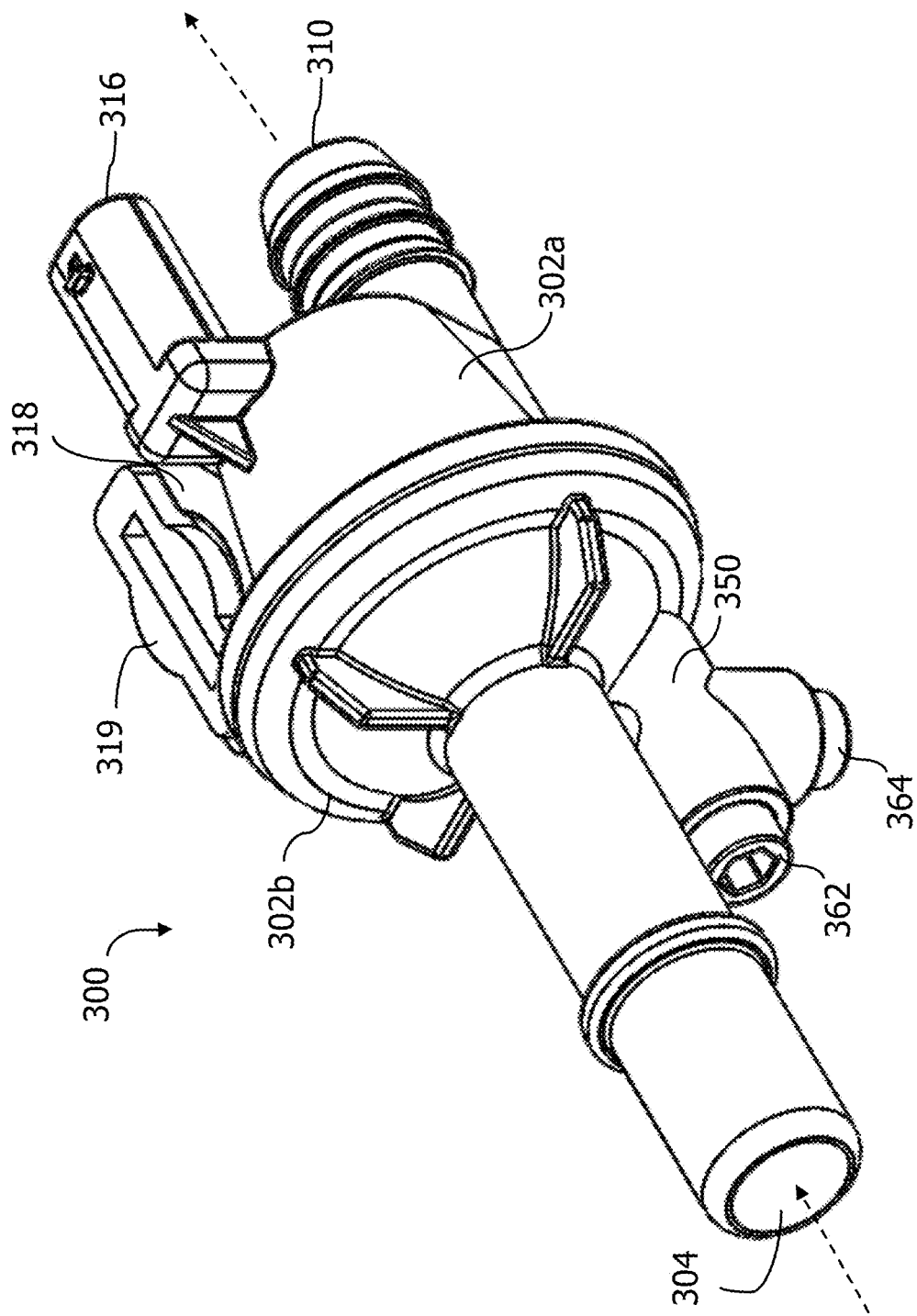
FIG. 6 is a side perspective view of a second embodiment of a magnetically latching valve.
Figure 7:
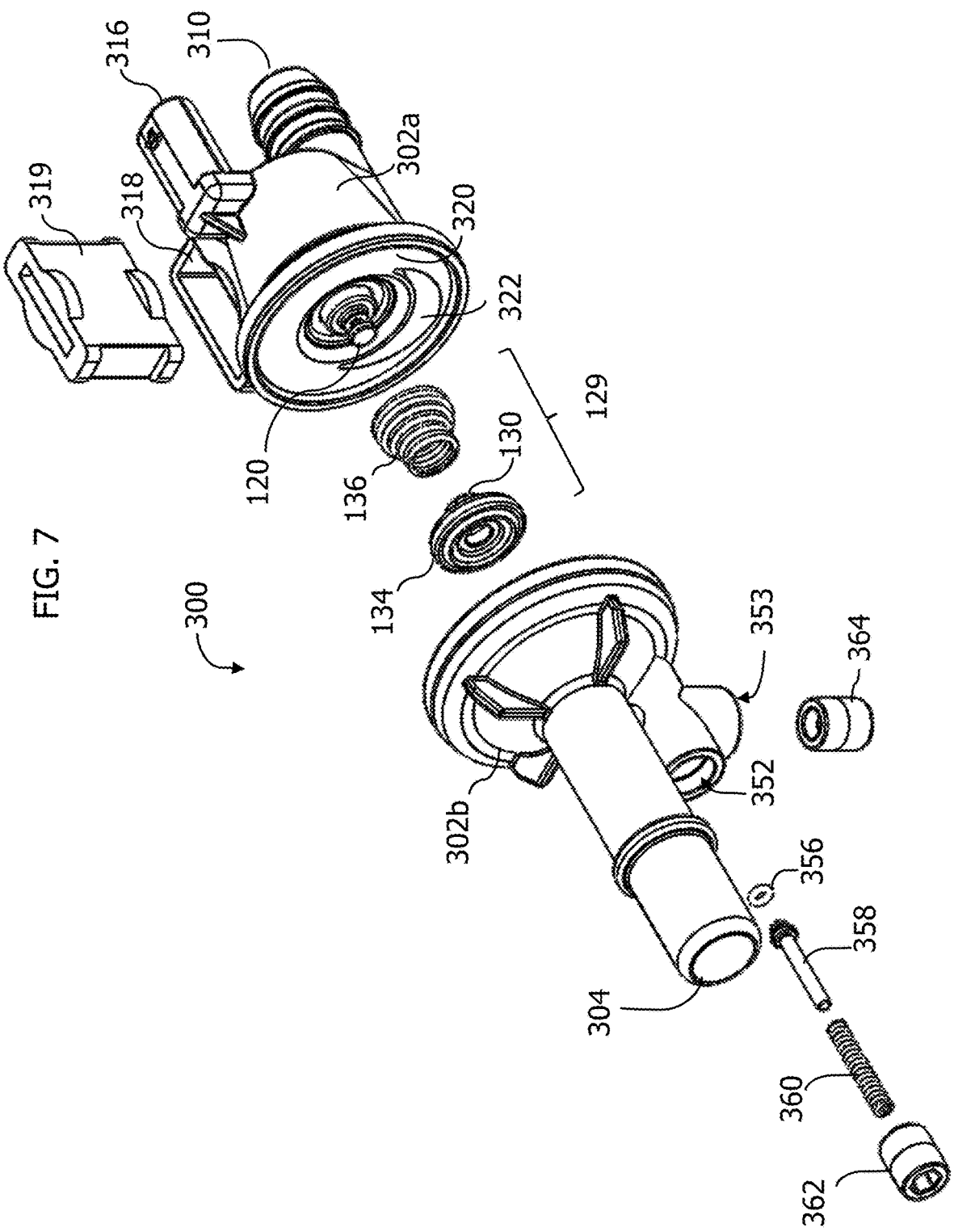
FIG. 7 is an exploded view of the second embodiment.
Figure 8:
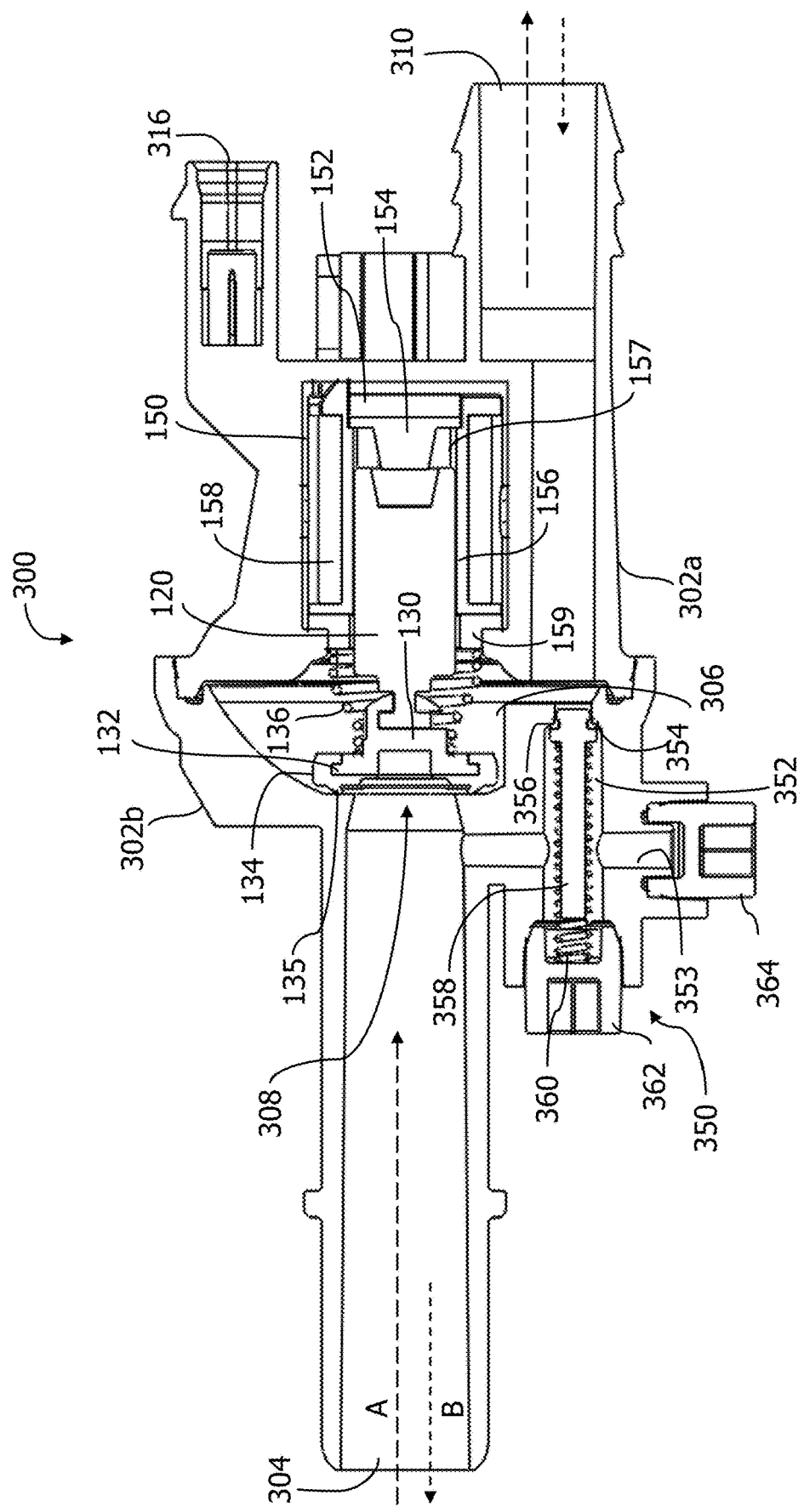
FIG. 8 is a longitudinal cross-section of the second embodiment in a fully closed position.

Turning now to FIGS. 6-8, the FTIV 300 is a magnetically latching valve similar to the embodiment described above but with the addition of a secondary poppet valve 350 for vacuum pressure relief to protect the fuel tank from imploding. The FTIV 300 has a housing 302 defined in two parts, a base 302a and a cover 302b, that are mated with a fluid tight seal. The fluid tight seal may be formed by spin welding, heat welding, laser welding, a snap-fit, an interference fit, an adhesive bond, or other known or herein after developed methods. The cover 302b includes a first port 304 in fluid communication with the chamber 306. The base 302a includes a second port 310 in fluid communication with a chamber 306 defined by the housing 302. The junction of the first port 304 with the chamber 306 defines a valve opening 308. The fluid communication between the first port 304 and the second port 310 is controlled by a linearly translatable armature 120 seated within a solenoid 122 and connected to a primary poppet valve 129 that makes a fluid tight seal with the valve opening 308 when the FTIV 300 is in a closed position as shown in FIG. 8. In FIG. 8, the dashed arrow with larger dashes is the primary flow direction (from the fuel tank to the fuel vapor canister) and the dashed arrow with smaller dashes is the vacuum relief direction, which is opposite the primary flow direction. The magnetically latching valve components are the same as those described above and as such use the same reference numbers. In all figures, any arrows denoted as "A" represent flow in the primary direction and any arrows denoted as "B" represent flow opposite the primary flow direction.

As best seen in FIG. 7, the top surface 320 of the base 302a, which defines an interior surface of the chamber 306, includes a trough 322 recessed therein defining the entrance to the second port 310. The trough 322 is positioned in alignment with the valve seat 354 of the secondary poppet valve 350, FIGS. 8 and 9, of the secondary poppet valve 350 housed within the cover 302b. The trough 322 may be crescent-shaped, but is not limited thereto. The base 302a includes the electrical plug or plug receptacle 316 that is in electrical communication with the wire coil 158 of the solenoid 122. The electrical plug or plug receptacle 316 is connectable to a mating electrical connector (not shown) in electrical communication with a controller of the fuel vapor management system or an internal combustion engine. Each of the exterior surfaces of the first port 304 and the second port 307 may include connecting features, such as flanges, ribs, grooves, barbs, or the like to attach a hose thereto or a duct of a device within the engine system. Also, the base 302a can have a sleeve or pocket 319 in which is seated a rubber isolator 319 as an attachment means for connecting the FTIV 300 to a mount in an engine system. Alternately, the base 302a could have a mounting hole for being mounted in an engine system by a fastener, such as a rivet, screw, bolt, etc.

The latching mechanism has moving components and stationary components, which are the same as the first embodiment. The moving components includes the armature 120, the primary poppet plug 130, an annual seal ring 134 seated over a radially protruding flange 132 of the primary poppet plug 130, and a primary spring 136 biasing the poppet plug toward the valve opening 308. The stationary components include a solenoid housing 150, having a closed end 151 and an open end 153 (labeled in FIG. 1), in which is seated, in order, a permanent magnet 152, a stop 154 that receives a first end 123 of the armature 120, a bobbin 156 having a coil 158 seated thereon, and a cover 159 fixedly connected to the open end of the housing that has a central opening to receive the armature 120. The armature 120 is linearly translatable within the solenoid 122, more specifically within the hollow core 157 of the bobbin 156, and it can move between an open position and a closed position, respectively, after a pulse of voltage is supplied to the solenoid.

The permanent magnet 152 is fixedly seated within the housing 102, and respectively the solenoid housing 150, at a position for magnetically latching the armature 120 in the open position after one pulse of voltage to the solenoid 122 moves the armature 120 to the open position. The primary spring 136 is seated around the connection of the armature 120 to the primary poppet plug 130 and has a first end 137 against the primary poppet plug 130 and a second end 139 against either the base 302b or the solenoid housing 150. The primary spring 136 biases the primary poppet plug 130 toward the valve opening 108 when the armature is in the closed position (FIG. 2) and has a pre-selected spring rate that mechanically relieves pressure if the spring force is exceeded while the armature 120 is in the closed position.

Still referring to FIGS. 6-8, cover 302b has a coaxial bore 352 in fluid communication with the chamber 306 and defining a valve seat 354 at the junction to the chamber 306 and a secondary bore 353 connecting the coaxial bore 352 to the first port for fluid communication therewith upstream of the valve seat 308. The components of a secondary poppet valve 350 are seated in the coaxial bore 352—a ring seal 356, a valve stem 358 upon which the ring seal 356 is seated, and a secondary compression spring 360 seated against a first weld plug 362 that seals the bore with a fluid tight seal and biases the valve stem 358 and ring seal 356 against the valve seat 354. Similarly, the secondary bore 353 has a second weld plug 364 that seals the bore with a fluid tight seal. The first and second weld plugs 362, 364 can be spin welded into or onto their respective bore. Arrow A is the direction of primary flow through the valve and Arrow B is the direction of flow when the secondary poppet valve opens for vacuum pressure relief of the fuel tank.

Figure 9:
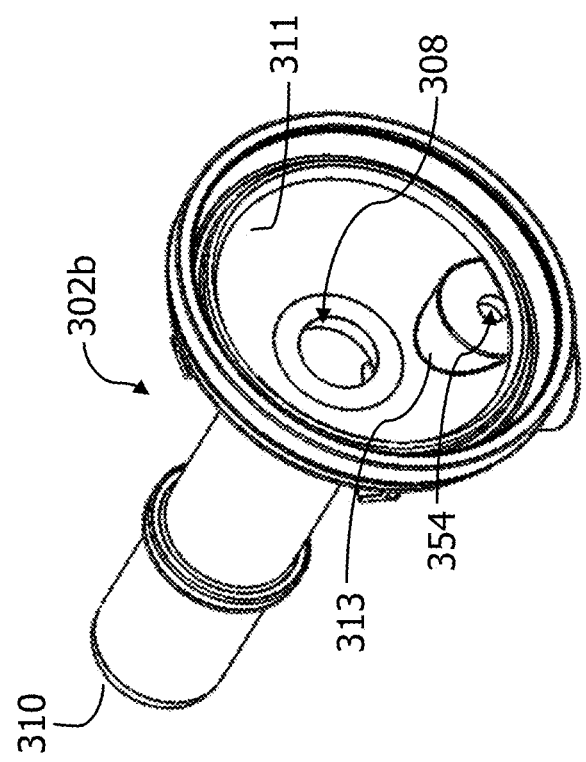
FIG. 9 is a bottom perspective view of the cover of the second embodiment.

As seen in FIG. 9, the bottom surface 311 of the cover 302b, which defines an interior surface of the chamber 306, can include a recess 313 therein to enhance fluid flow into the second port 310. The housing 302 is made of the same materials discussed above for the first embodiment. Likewise, the seal rings can be made of the materials discussed above.

Figure 10:
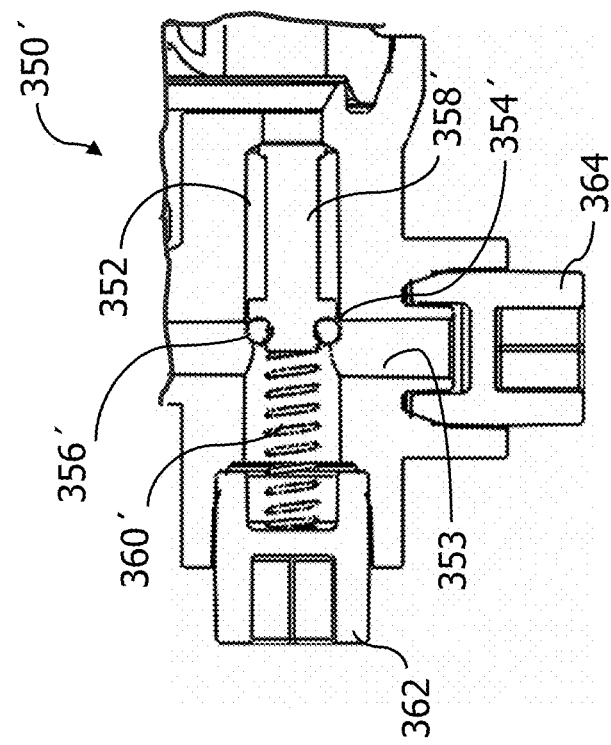
FIG. 10 is a longitudinal cross-sectional view of an alternate embodiment for the secondary poppet valve of FIGS. 6-8.

Turning now to FIG. 10, an alternate embodiment for the secondary poppet valve 350' can have the valve seat 354' at the intersection of the coaxial bore 352 and secondary bore 353 rather than at an entrance into the chamber 306. In this configuration, the valve stem 358' is shorter and the seal ring 356' is proximate the spring 360', but the function is the same for vacuum relief in the system which will be describe below with respect to the embodiment in FIGS. 6-8.

Turning now to FIGS. 11-14, another embodiment of a FTIV 300' is shown that has the same base 302a including all the components of the magnetically latching solenoid housed therein. As such, a description of these components and features are found above. Here, the secondary poppet valve 351 has been integrated into the center of the primary poppet valve 329 for a more compact device, which eliminates the secondary bores in the cover 302b. The primary poppet plug 330' has been modified to have a fluid passageway therethrough with an entrance 374 in the body shaft 379 and an exit 378 in the seal face 376 that receives the first end 137 of the spring 136. The seal face 376 includes the annular flange 332 about which is seated the seal ring 334. The seal ring 334 includes a bore 380 therethrough that is aligned with the exit 378 in the seal face 376. The bore 380 has a first annual seal bead 382 protruding therefrom toward the secondary poppet 372 to define a fluid tight valve seal against the secondary poppet 372. The seal ring 334 has a second seal bead 383 concentric about the first annular seal bead protruding toward the first port 304 to define a fluid tight valve seal against the valve seat 308.

Figure 13:
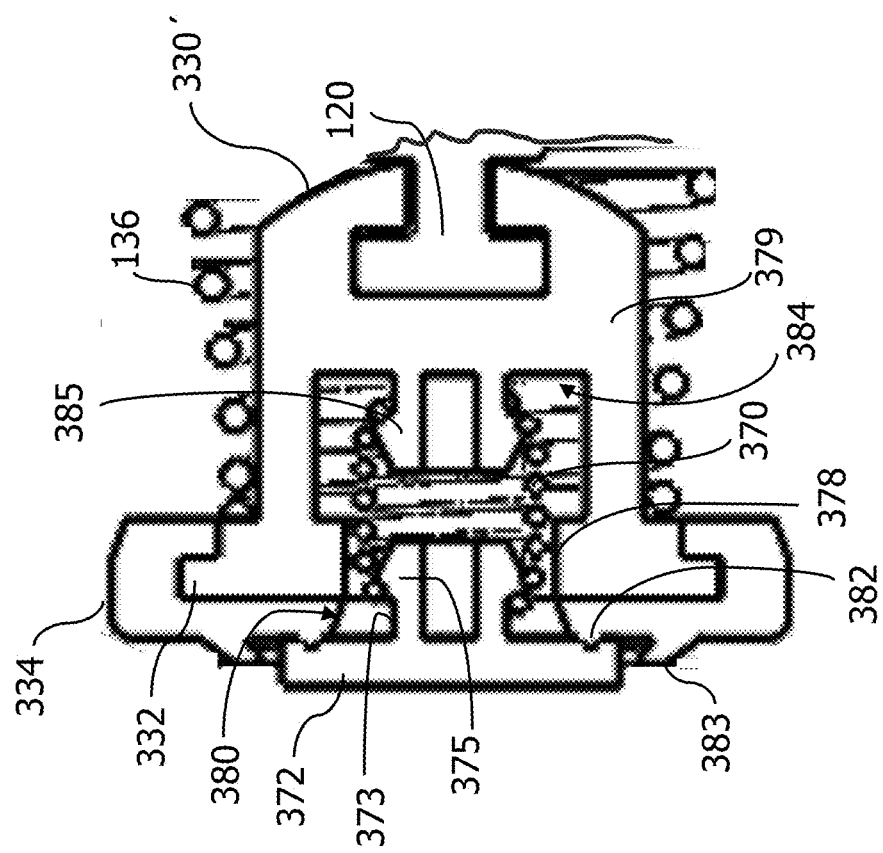
FIG. 13 is an enlarged cross-sectional view of the primary poppet-secondary poppet assembly.
Figure 12:
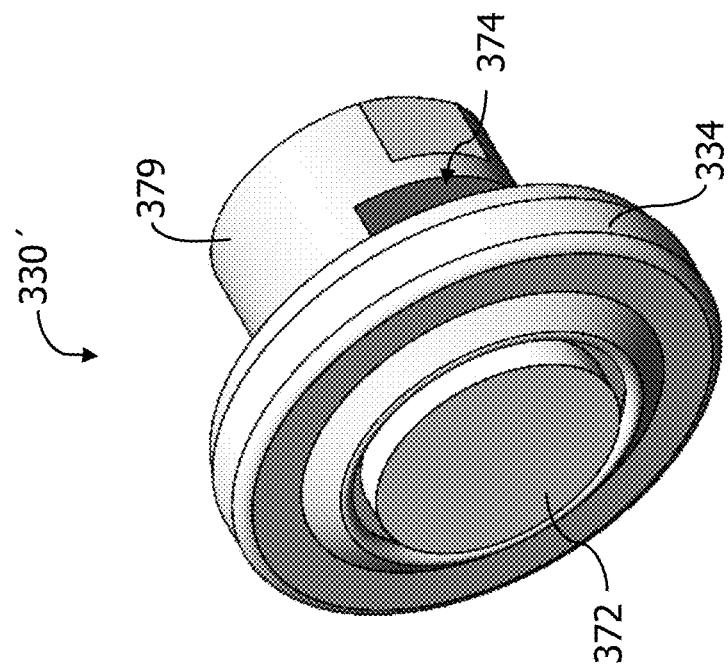
FIG. 12 is a side perspective view of primary poppet-secondary poppet assembly.

As best seen in FIG. 13, the secondary poppet plug 372 includes a stem 373 that is received in a chamber 384 inside the body shaft 379 of the primary poppet plug 330'. The stem 373 has a smaller dimension than the bore 380 in the seal ring 334 and the exit 378 of the primary poppet plug 330' to provide fluid flow around the stem 373 when in an open position. The stem 373 has a spring retention feature 375 and a tension spring 370 operatively connected the spring retention feature 375 in tension to pull the secondary poppet plug 372 against the seal ring 334 for a fluid tight seal. Likewise, the chamber 384 has a second spring retention feature 385 protruding from a surface thereof that faces the entrance 374 toward the entrance 374. The second end of the spring 370 is operatively connected to the second spring retention feature 385. In operation, when the secondary poppet plug 372 is moved to an open position for vacuum relief of the fuel tank, the tension spring 370 is stretched and will retract once the pressure differential subsides. A benefit to this design is that the secondary poppet plug 372 will only pull away from the primary poppet plug 330' when the primary poppet valve 329 is in the closed position.

Figure 17:
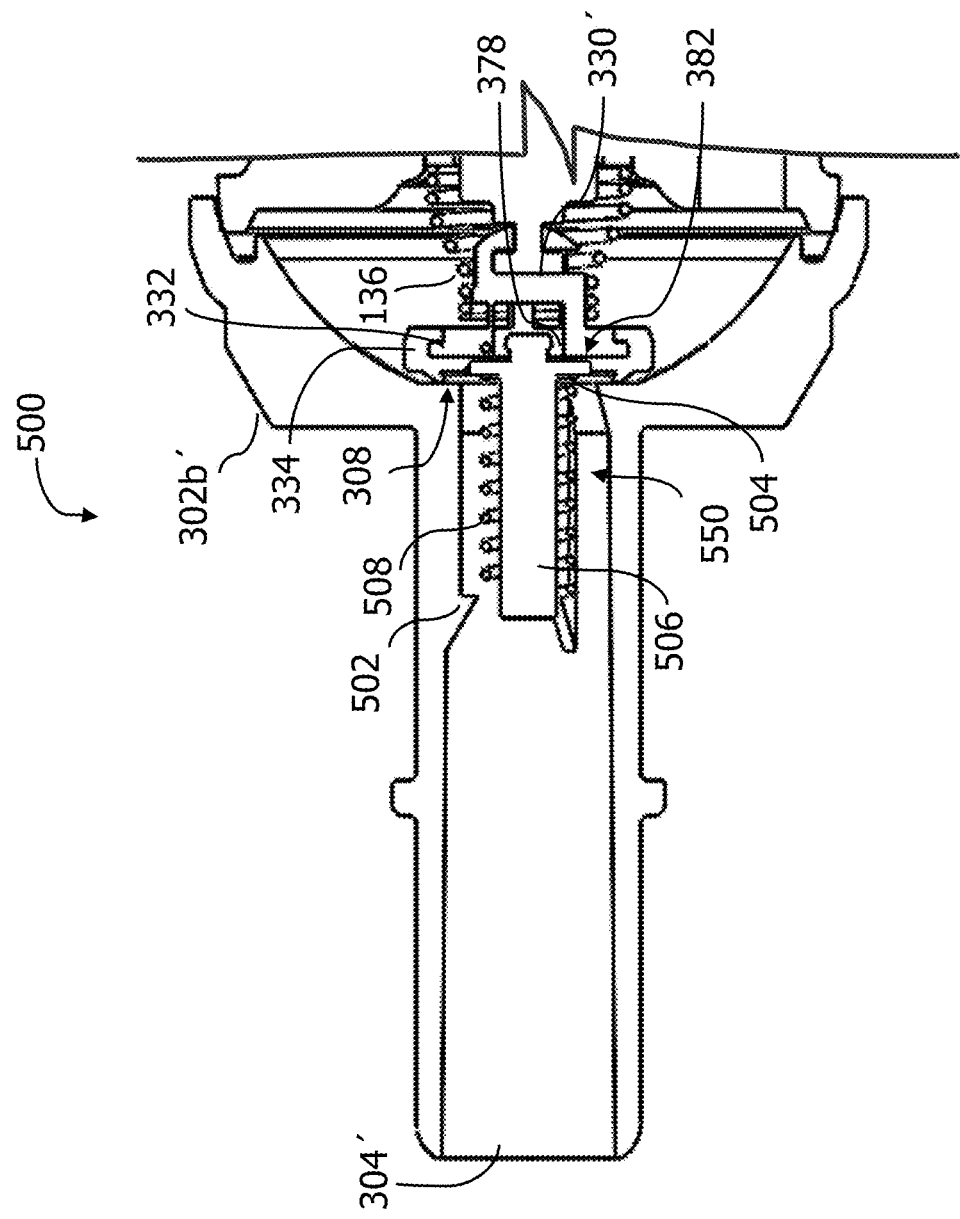
FIG. 17 is a longitudinal cross-section of a partial view of a fourth embodiment of a magnetically latching valve.

Another coaxial embodiment for the secondary poppet valve is found in FIG. 17. Here, the secondary poppet valve 550 is seated in the first port 304' of the cover 302b' against a stop 502 protruding into the passageway of the first port 304'. The stop 502 defines openings to enable fluid flow through the passageway or can be a plurality of inward projecting fins. The components of a secondary poppet valve 550 are seated in the first port 304' with the poppet head 504 on stem 506 facing the bore 380 in the ring seal 334 and the exit 378 of the poppet plug 330'. A secondary spring 508, which is a compression spring, is seated against the stop 502 and biases the valve stem 506 toward the first annular seal bead 382 of the seal ring 334 for a fluid tight seal against the seal ring 334 of the primary poppet plug 330'.

Figure 15:
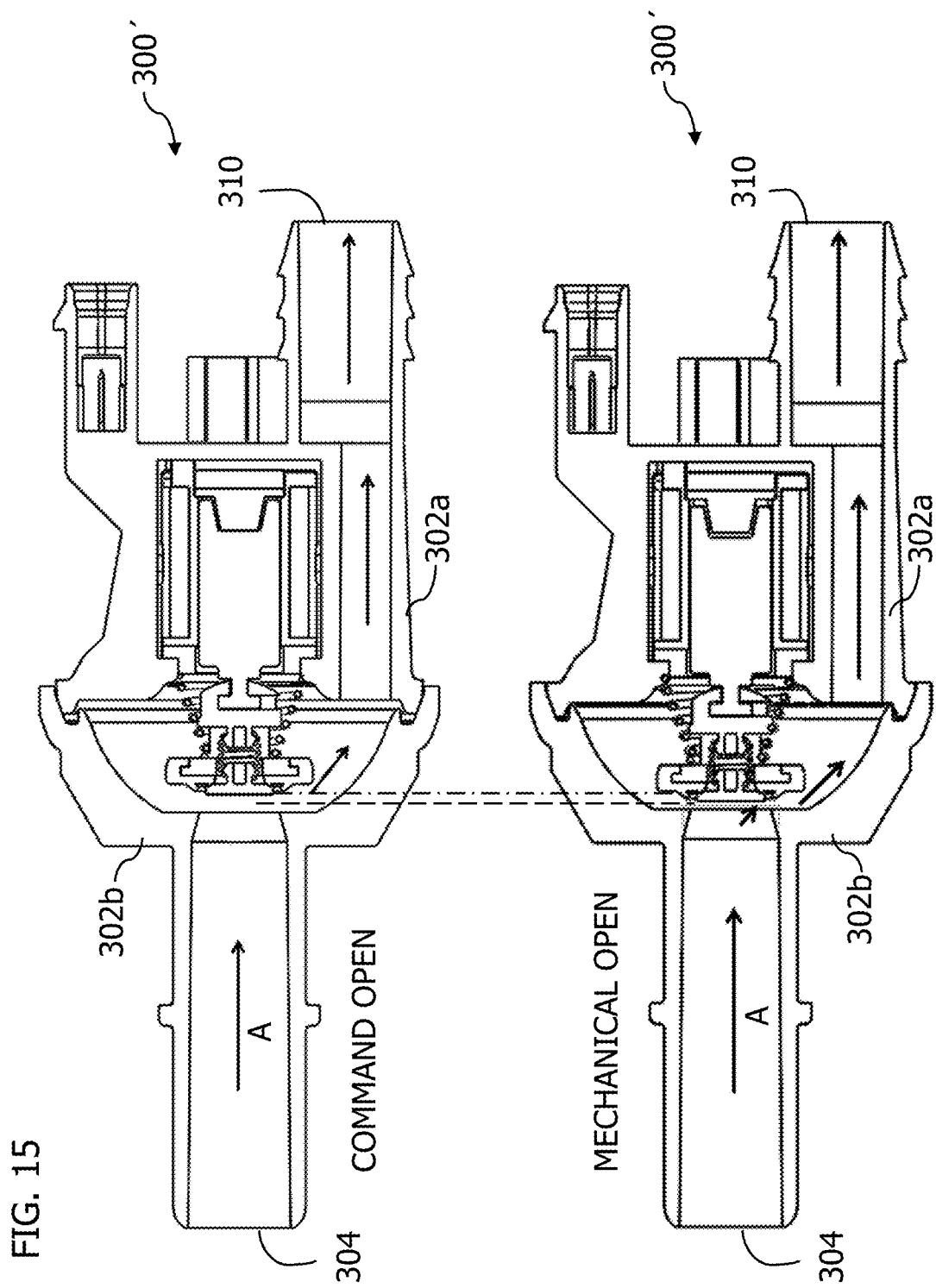
FIG. 15 is a longitudinal cross-section of the third embodiment held in its commanded open position compared to its un-commanded pressure relief partially open position.

For all embodiments of the FTIV, the valve starts in the closed position and opens similarly during operation of an engine system. Using the embodiment of FIG. 11 as an example, we turn to FIGS. 14-16 to illustrate the various positions of the valve during operation. FIG. 14 is the valve in its normally closed position in which is it is biased by the primary spring 136 and the solenoid is non-activated and the first port 304 is connected for fluid communication with the headspace of a fuel tank and the second port 310 is connected for fluid communication with a fuel vapor canister. Then, in operation, during a fueling event, the solenoid is activated by a pulse of electricity, which translates the armature 120 to a fully open position as described above for the first embodiment and the permanent magnet holds the valve in the fully open position until the solenoid is again activated with a pulse that reverses its polarity. This fully open position is shown in FIG. 15 as the "Command Open" position. This Command Open position is compared to a "Mechanical Open" position also shown in FIG. 15, the Command Open position being greater than the Mechanical Open position. When the valve is closed, the biasing force of the spring 136 can be overcome by the pressure in the fuel tank to partially open the poppet (moves to the right in FIG. 15) under a pure mechanical operation (no assist from the solenoid) as a pressure relief position, thereby enabling flow from the fuel tank in the direction of the arrows and preventing rupture of the fuel tank.

Figure 16:
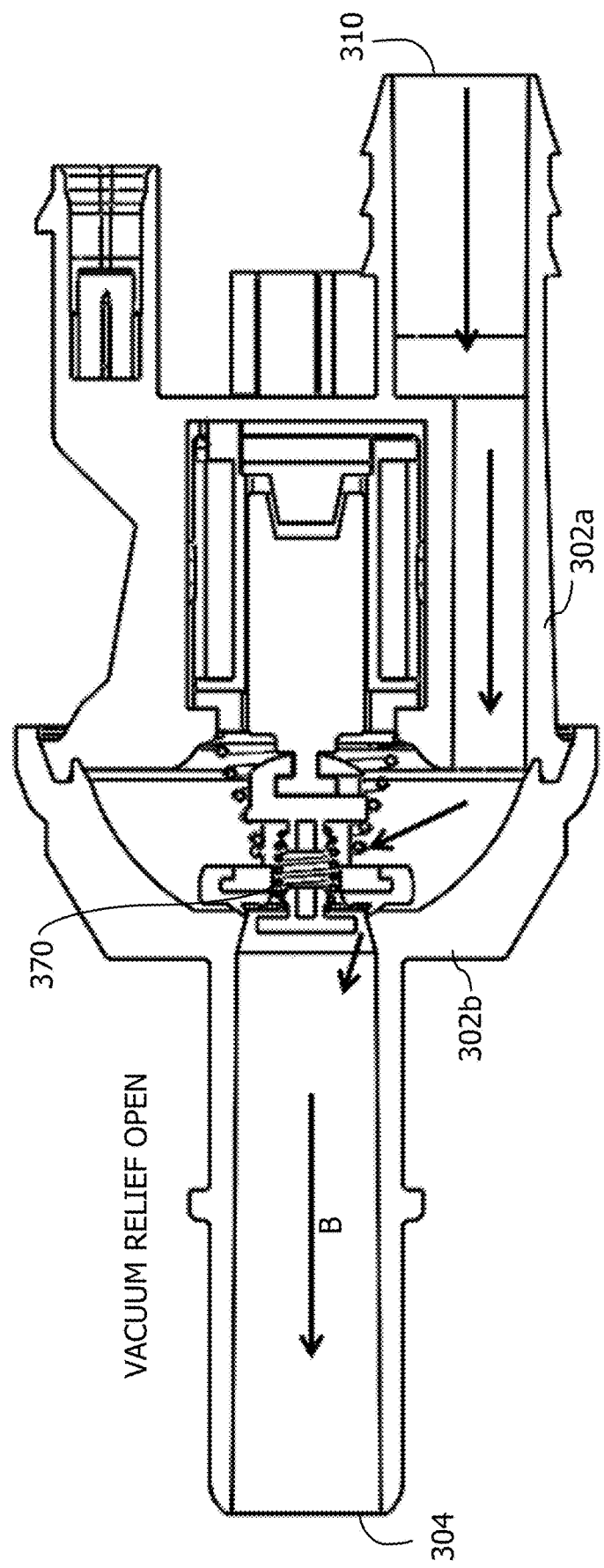
FIG. 16 is a longitudinal cross-section of the third embodiment with the secondary poppet valve in a vacuum relief open position.

Turning now to FIG. 16, with the presence of the secondary poppet valve, when the valve is closed, if a negative pressure (vacuum) exists in the fuel tank, connected to the first port 304, that enables a pressure differential to overcome the biasing force of the tension spring 370 in the secondary poppet valve, the secondary poppet valve opens (moves to the left) enabling fluid flow in the direction of the arrows and preventing implosion of the fuel tank. The secondary poppet valve provides a purely mechanical vacuum relief function.

The FTIV 300 allows vehicles to meet emissions regulations (EPA, CARB, China 6, Euro 6.2, etc.) for hybrid electric vehicles and plug-in hybrid electric vehicles to keep the vapors stored within the fuel tank. Here, a non-integrated refueling canister only system is used, which has a valve that blocks fuel vapors from within the tank from traveling to the carbon canister, except during a refueling event. The fuel tank needs to withstand high pressures and vacuums structurally, but the FTIV 300 also allows the tank to 'breathe' before the tank structural integrity is compromised. This valve allows depressurization of the fuel tank vapors and enough flow into the carbon canister to prevent fuel nozzle shut offs or "premature shut-offs" during refueling. This valve has a very compact package specifically using a magnetically latching solenoid with a return spring. The valve will hold itself unpowered in both open and closed positions after a single pulse of voltage to the solenoid. The magnetic latching solenoid only requires a 3 mm armature stroke, whereas the mechanical latching valve requires enough power to overcome a 7 mm stroke to index the position.

Spin welding is a lower cost manufacturing process and is suitable for the embodiments disclosed herein.

In each embodiment above, the FTIV 300 was oriented in the engine system such that the primary spring 136 functioned as the mechanical pressure relief spring for the fuel tank and the secondary spring 370 functioned as the vacuum relief spring for the fuel vapor canister. As such, the first port 304, 304' was in fluid communication with the fuel tank 202 and the second port 310, 310' was in fluid communication with the fuel vapor canister 242.

Figure 18:
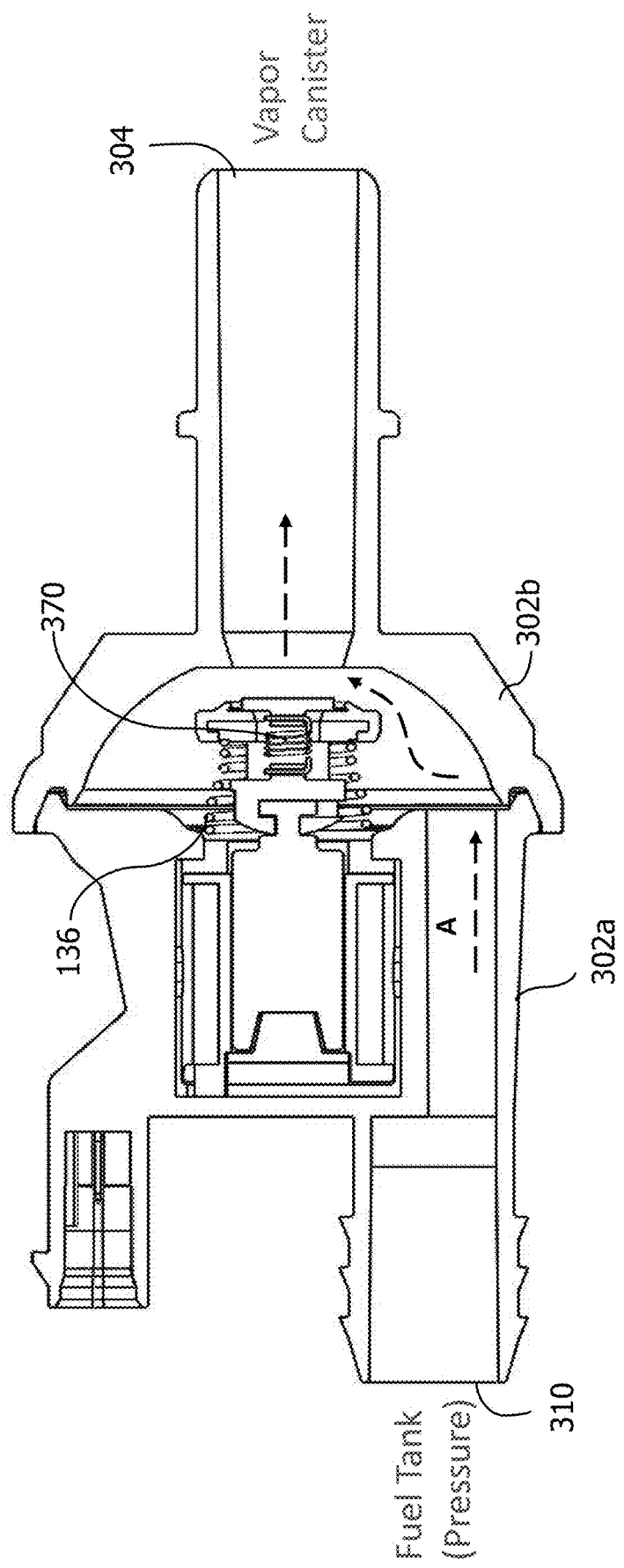
FIG. 18 is a longitudinal cross-section of the third embodiment held in its commanded open position when the first port 304 is in fluid communication with the fuel vapor canister and the second port 310 is in fluid communication with headspace of the fuel tank, the opposite orientation of FIGS. 14-16.

However, with reference now to FIGS. 18 to 20 and using the FTIV 300' of FIG. 11 as an example, the FTIV 300' has been determined to provide better functionality when reversed in its orientation between the fuel tank 202 and the fuel vapor canister 242. In this embodiment, the second port 310 is in fluid communication with the fuel tank 202 and the first port 304 is in fluid communication with the fuel vapor canister 242. Now, the primary spring 136 functions as the vacuum relief spring and the secondary spring 370 functions as the mechanical pressure relief spring for the fuel tank. FIG. 18 illustrates the commended open position controlled by the magnetically latching solenoid. FIG. 19 illustrates the fuel vapor pressure from the fuel tank opening the secondary poppet 372 by overcoming the spring force of the secondary spring 370. FIG. 20 illustrates the armature in a closed position, but the pressure differential has overcome the spring force of the primary spring 136 enabling flow from the fuel vapor canister to the fuel tank. This allows the higher vacuum relief flow requirement (tank under vacuum: 14SLPM at −14 kPA) to be controlled by the larger return spring and main poppet (larger flow path) and the lower pressure relief flow rate (tank under pressure: 6SLPM at 43.5 kPa) to be controlled by the smaller relief spring and relief poppet (smaller flow path).

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A magnetic latching valve of a vehicle engine comprising:
   a housing having an inlet port and an outlet port solely in controlled fluid communication with one another;
   wherein the housing encloses:
   a linearly translatable armature seated within a solenoid and connected to a primary poppet valve; wherein the armature is movable between a fully open position and a closed position, respectively, after a pulse of voltage to the solenoid and is in an unpowered state thereafter;
   a permanent magnet fixedly seated within the housing in a position to magnetically latch the armature in the fully open position after one pulse of voltage to the solenoid moves the armature to the fully open position for primary flow from the first port to the second port;

a primary spring seated against a primary poppet plug of the primary poppet valve, wherein the primary spring biases the primary poppet plug to a closed position when the armature is in the closed position and has a pre-selected spring rate that mechanically relieves pressure by opening the primary poppet valve a distance less than the fully open position when the spring force is exceeded, thereby also allowing flow in the primary flow direction;

wherein the primary poppet plug comprises a body shaft, a seal face, a fluid passageway therethrough having an entrance in the body shaft and an exit in the seal face, and a first spring retention feature inside the body shaft;

a tension spring operatively connected to the spring retention feature; and a secondary poppet plug having a second spring retention feature operatively connected to the tension spring, wherein the tension spring applies a pull force to the secondary poppet plug, thereby holding the secondary poppet plug closed against the seal face of the primary poppet plug;

wherein the tension spring has a spring rate pre-selected to mechanically relieve pressure by opening the secondary poppet plug while the primary poppet valve is closed when a pressure differential is present relative to the first port and the second port that overcomes the pull force applied by the tension spring.

2. The magnetic latching valve of claim 1, wherein the housing defines a plug or plug receptacle in electrical communication with the solenoid.

3. The magnetic latching valve of claim 1, wherein the primary spring is a coil spring.

4. The magnetic latching valve of claim 3, wherein the primary spring is a conically shaped coil spring.

5. A system for refueling a vehicle having an internal combustion engine, the system comprising:

a fuel tank in fluid communication with a filling tube;

a magnetically latching valve according to claim 1 controlling fluid communication between vapors in the fuel tank and a fuel vapor canister;

an intake manifold of an internal combustion engine in fluid communication with the fuel vapor canister;

wherein the magnetically latching valve is in electrical communication with a controller configured to open the magnetically latching valve during vehicle refueling and close the magnetically latching valve during normal operation; and wherein the magnetically latching valve is orientable between the fuel tank and the fuel vapor with either of the first port or the second port in fluid communication with the vapors in the fuel tank, thereby changing which of the primary spring or the secondary spring provides fuel tank vacuum relief.

6. The system of claim 5, wherein the solenoid is in electrical communication with a plug or plug receptacle in the housing and the plug or plug receptacle is connected to a mating electrical connector in electrical communication with the controller.

7. The system of claim 5, wherein the controller includes an H-bridge control system that reverse the polarity of the solenoid to move the armature between the open position and the closed position.

8. The system of claim 5, wherein the internal combustion engine is a hybrid engine.

9. The system of claim 8, wherein the system is a boosted system having a Venturi device in a bypass around a turbocharger or supercharger and the Venturi device has a suction port in fluid communication with the fuel vapor canister.

10. The system of claim 9, comprising a canister purge valve controlling fluid communication between the fuel vapor canister and the intake manifold.

11. The system of claim 10, wherein the suction port is in fluid communication with the fuel vapor canister, upstream of the canister purge valve.

12. The system of claim 5, wherein the magnetically latching valve is in parallel flow relationship with a tank pressure control valve.

13. The system of claim 5, wherein the pre-selected spring rate of the primary spring is set to prevent fuel nozzle shut offs during refueling.

* * * * *